(12) United States Patent
Shiraki

(10) Patent No.: US 12,362,367 B2
(45) Date of Patent: Jul. 15, 2025

(54) ELECTRODE, BATTERY CELL, CELL STACK, AND REDOX FLOW BATTERY SYSTEM

(71) Applicant: SUMITOMO ELECTRIC INDUSTRIES, LTD., Osaka (JP)

(72) Inventor: Kousuke Shiraki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 381 days.

(21) Appl. No.: 17/764,628

(22) PCT Filed: Oct. 9, 2019

(86) PCT No.: PCT/JP2019/039925
§ 371 (c)(1),
(2) Date: Mar. 29, 2022

(87) PCT Pub. No.: WO2021/070311
PCT Pub. Date: Apr. 15, 2021

(65) Prior Publication Data
US 2022/0336823 A1   Oct. 20, 2022

(51) Int. Cl.
*H01M 4/96* (2006.01)
*H01M 8/18* (2006.01)

(52) U.S. Cl.
CPC ............ *H01M 4/96* (2013.01); *H01M 8/188* (2013.01)

(58) Field of Classification Search
None
See application file for complete search history.

(56) References Cited

U.S. PATENT DOCUMENTS

| | | | |
|---|---|---|---|
| 4,507,272 A | 3/1985 | Mullen et al. | |
| 2010/0266827 A1* | 10/2010 | Oyama | C08J 5/042 428/367 |
| 2017/0309903 A1* | 10/2017 | Peled | H01M 4/366 |
| 2018/0212254 A1* | 7/2018 | Oh | C25B 11/091 |
| 2018/0282909 A1* | 10/2018 | Hirakawa | D06M 11/34 |
| 2018/0331373 A1 | 11/2018 | Byun et al. | |
| 2019/0123389 A1* | 4/2019 | Nakagaki | H01M 4/0447 |
| 2019/0186024 A1* | 6/2019 | Cui | B01J 21/185 |

FOREIGN PATENT DOCUMENTS

| | | |
|---|---|---|
| EP | 3 546 435 A1 | 10/2019 |
| JP | S59-207824 A | 11/1984 |
| JP | 1993234612 A5 * | 9/1993 |
| JP | H05-234612 A | 9/1993 |
| JP | 2001-085022 A | 3/2001 |
| JP | 2017-010809 A | 1/2017 |
| JP | 2018-538667 A | 12/2018 |
| WO | 2017/083439 A1 | 5/2017 |
| WO | 2017/171289 A1 | 10/2017 |

OTHER PUBLICATIONS

English machine Translation of JP1993234612A5 (Year: 1993).*

* cited by examiner

*Primary Examiner* — Scott J. Chmielecki
(74) *Attorney, Agent, or Firm* — Oliff PLC

(57) ABSTRACT

An electrode includes a carbon fiber, wherein the carbon fiber has a first region including a surface of the carbon fiber, when a cross section of the carbon fiber is analyzed by electron energy loss spectroscopy, the first region has peaks both around 285 eV and around 530 eV, and the first region is provided up to 10% of a diameter of the carbon fiber from the surface toward a center.

11 Claims, 9 Drawing Sheets

ELECTRODE, BATTERY CELL, CELL STACK, AND REDOX FLOW BATTERY SYSTEM

TECHNICAL FIELD

The present disclosure relates to an electrode, a battery cell, a cell stack, and a redox flow battery system.

BACKGROUND ART

In a redox flow battery of PTL 1, a stacked body formed by stacking a porous plate and a fiber aggregate is used as an electrode of a battery cell. The porous plate is made of a porous carbon material formed to have a continuous three-dimensional network structure by physical bonding of carbons. The porous plate is subjected to heat treatment in order to increase the hydrophilicity of the carbons. The fiber aggregate is mainly made of a plurality of carbon fibers.

CITATION LIST

Patent Literature

PTL 1: Japanese Patent Laying-Open No. 2017-10809

SUMMARY OF INVENTION

An electrode according to the present disclosure is
an electrode including a carbon fiber, wherein
the carbon fiber has a first region including a surface of the carbon fiber,
when across section of the carbon fiber is analyzed by electron energy loss spectroscopy, the first region has peaks both around 285 eV and around 530 eV, and
the first region is provided up to 10% of a diameter of the carbon fiber from the surface toward a center.

A battery cell according to the present disclosure includes the electrode according to the present disclosure. A cell stack according to the present disclosure includes the battery cell according to the present disclosure. A redox flow battery system according to the present disclosure includes the electrode according to the present disclosure, the battery cell according to the present disclosure, or the cell stack according to the present disclosure.

DETAILED DESCRIPTION

Figure 1:
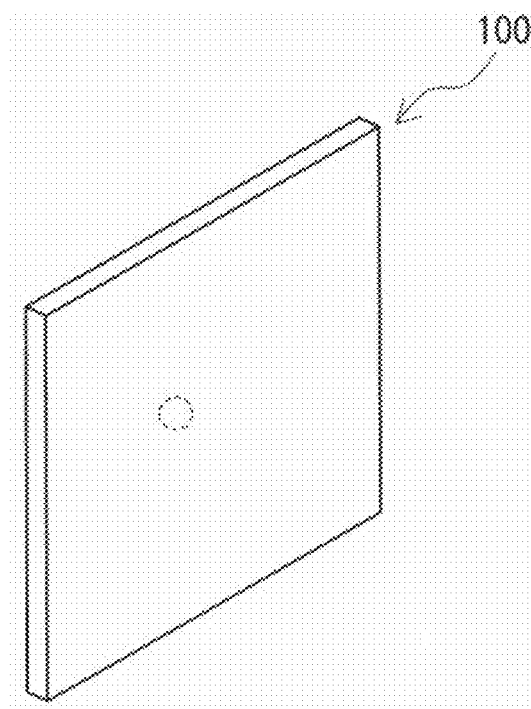
FIG. 1 is a perspective view showing an overview of an electrode included in a redox flow battery according to an embodiment.

Problem to be Solved by the Present Disclosure

It is desirable that a carbon fiber included in an electrode is not only excellent in hydrophilicity but also excellent in durability. This is because the carbon fiber excellent in hydrophilicity can come into good contact with an electrolyte, and thus, the electrode including the carbon fiber makes it easy to construct a redox flow battery system that can achieve a reduction in cell resistivity. This is also because the carbon fiber excellent in durability is difficult to become thin as a result of charging and discharging, and thus, the electrode including the carbon fiber makes it easy to construct a redox flow battery system that is usable tor a long time.

Thus, an object of the present disclosure is to provide an electrode, a battery cell and a cell stack, which make it easy to construct a redox flow battery system that is low in cell resistivity and usable for a long time. In addition, an object of the present disclosure is to provide a redox flow battery system that is low in cell resistivity and usable for a long time.

Advantageous Effect of the Present Disclosure

The electrode according to the present disclosure, the battery cell according to the present disclosure and the cell stack according to the present disclosure make it easy to construct a redox flow battery system that is low in cell resistivity and usable for a long time. The redox flow battery system according to the present disclosure is low in cell resistivity and usable for a long time.

Description of Embodiment of the Present Disclosure

Aspects of the present disclosure will be first listed below for explanation.

(1) An electrode according to one aspect of the present disclosure is an electrode including a carbon fiber, wherein
the carbon fiber has a first region including a surface of the carbon fiber,
when a cross section of the carbon fiber is analyzed by electron energy loss spectroscopy, the first region has peaks both around 285 eV and around 530 eV, and
the first region is provided up to 10% of a diameter of the carbon fiber from the surface toward a center.

The above-described electrode makes it easy to construct a redox flow battery system that is low in cell resistivity and usable for a long time. This is because the first region provided in a surface layer including the surface of the carbon fiber is excellent in hydrophilicity and durability as described below.

Having a peak around 285 eV means that the first region has a highly crystalline carbon crystal structure. Having a peak around 530 eV means that the first region contains oxygen. Since the first region containing oxygen is provided in the surface layer including the surface of the carbon fiber, the first region is excellent in hydrophilicity. Therefore, the carbon fiber can come into good contact with an electrolyte. Accordingly, the electrode including the carbon fiber makes it easy to construct an RF battery system that is low in cell resistivity. In addition, since the first region having a highly crystalline carbon crystal structure is provided in the surface layer of the carbon fiber, the first region is excellent in durability. Being excellent in durability means that the carbon fiber is difficult to become thin as a result of charging and discharging of a redox flow battery system. Particularly, the carbon fiber does not contain oxygen in a portion that is inner than the first region. Therefore, the crystallinity of the carbon crystal structure in the inner portion is higher, and thus, the durability of the carbon fiber is more excellent. Accordingly, the electrode including the carbon fiber makes it easy to construct a redox flow battery system that is usable for a long time.

(2) As one form of the above-described electrode,
the carbon fiber may have a second region closer to the center than the first region, and
the second region may have no peak around 530 eV and have a peak around 285 eV.

The above-described electrode makes it easier to construct a redox flow battery system that is usable for a long time. The reason for this is as follows. Since the second region does not substantially contain oxygen, the crystallinity of the carbon crystal structure in the second region is higher than that in the first region. That is, the second region is more excellent in durability than the first region, and thus, the durability of the carbon fiber is more excellent.

(3) As one form of the electrode in (2) described above,
the first region and the second region may further have a peak around 291 eV.

The above described electrode makes it easier to construct a redox flow battery system that is usable for a long time. The reason for this is as follows. Having a peak around 291 eV means that the first region and the second region have a more highly crystalline carbon crystal structure. That is, the durability of the carbon fiber is more excellent, and thus, the durability of the electrode is more excellent.

(4) As one form of the electrode in (3) described above.
in the first region, a ratio h2/h1 of a height h2 of the peak around 291 eV to a height h1 of the peak around 285 eV may be equal to or more than 1.1 and equal to or less than 2.

The above-described electrode makes it easier to construct a redox flow battery system that is usable for a long time. This is because above-described ratio h2/h1 satisfies the above-described range, and thus, the crystallinity of the carbon crystal structure in the first region is higher.

(5) As one form of the above-described electrode,
when a total area of an area S1 in a range of 340 eV to 380 eV and an area S2 in a range of 550 eV to 580 eV is defined as 100% at an arbitrary location of the first region, a ratio of the area S2 to the total area may be equal to or more than 0.1% and equal to or less than 30%.

Since the ratio of area S2 is equal to or more than 0.1%, the first region contains a sufficient amount of oxygen, and thus, the first region is excellent in hydrophilicity. Since the ratio of area S2 is equal to or less than 30%, the first region does not contain an excessive amount of oxygen. Therefore, the carbon crystallinity is difficult to decrease due to oxygen, and thus, the first region is excellent in durability.

(6) A battery cell according to one aspect of the present disclosure includes the electrode in any one of (1) described above to (5) described above.

The above-described battery cell makes it easy to construct a redox flow battery system that is low in cell resistivity and usable for a long time. This is because the above-described battery cell includes the electrode excellent in hydrophilicity and durability.

(7) A cell stack according to one aspect of the present disclosure includes a plurality of battery cells in (6) described above.

The above-described cell stack makes it easy to construct a redox flow battery system that is low in cell resistivity and usable for a long time. This is because the battery cell included in the cell stack includes the electrode excellent in hydrophilicity and durability.

(8) A redox flow battery system according to one aspect of the present disclosure includes the electrode in any one of (1) described above to (5) described above, the battery cell in (6) described above, or the cell stack in (7) described above.

The above-described redox flow battery system is low in cell resistivity and usable for a long time. This is because the above-described redox flow battery system includes the electrode excellent in hydrophilicity and durability, the battery cell including the electrode, or the cell stack including the battery cell.

Details of Embodiment of the Present Disclosure

Details of an embodiment of the present disclosure will be described below. In the figures, the same reference characters denote the elements having the same designations.

Embodiment

[Redox Flow Battery System]

Figure 2:
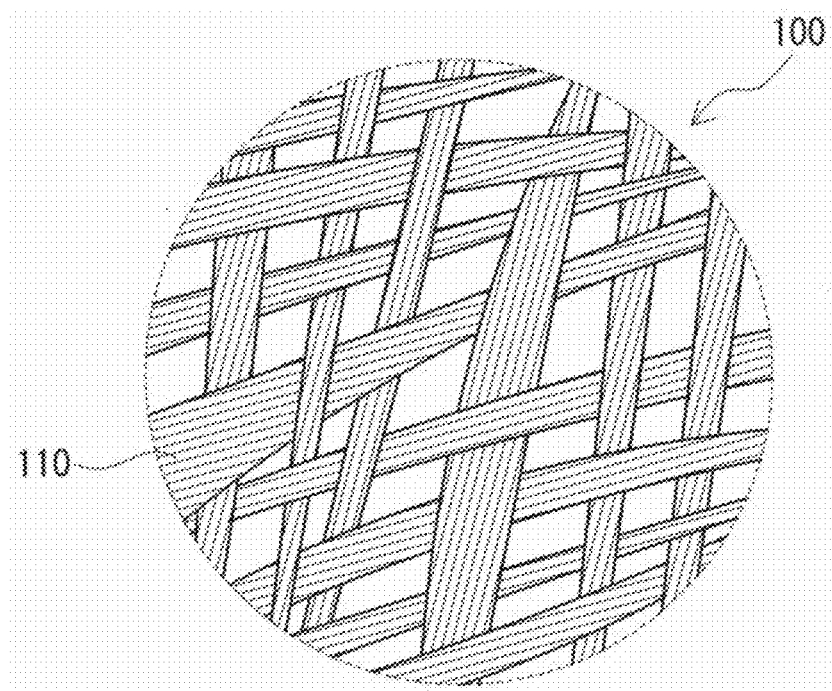
FIG. 2 is an enlarged view showing, in an enlarged manner, a region surrounded by a broken line circle in the electrode shown in FIG. 1.
Figure 3:
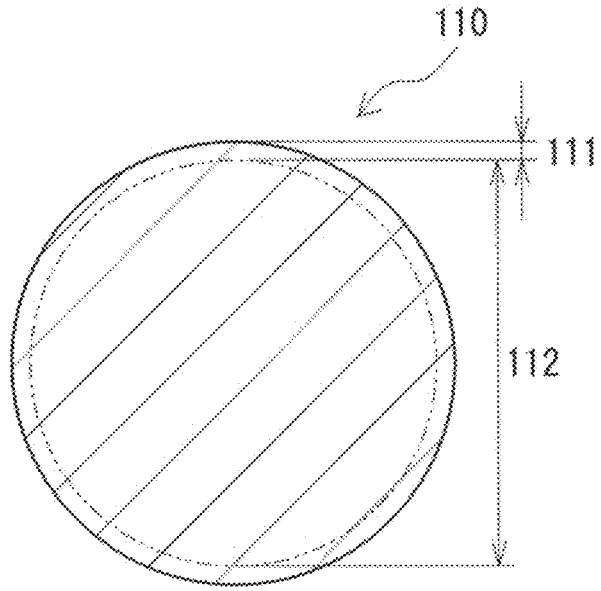
FIG. 3 shows a horizontal cross section of a carbon fiber included in the electrode of the redox flow battery according to the embodiment.
Figure 4:
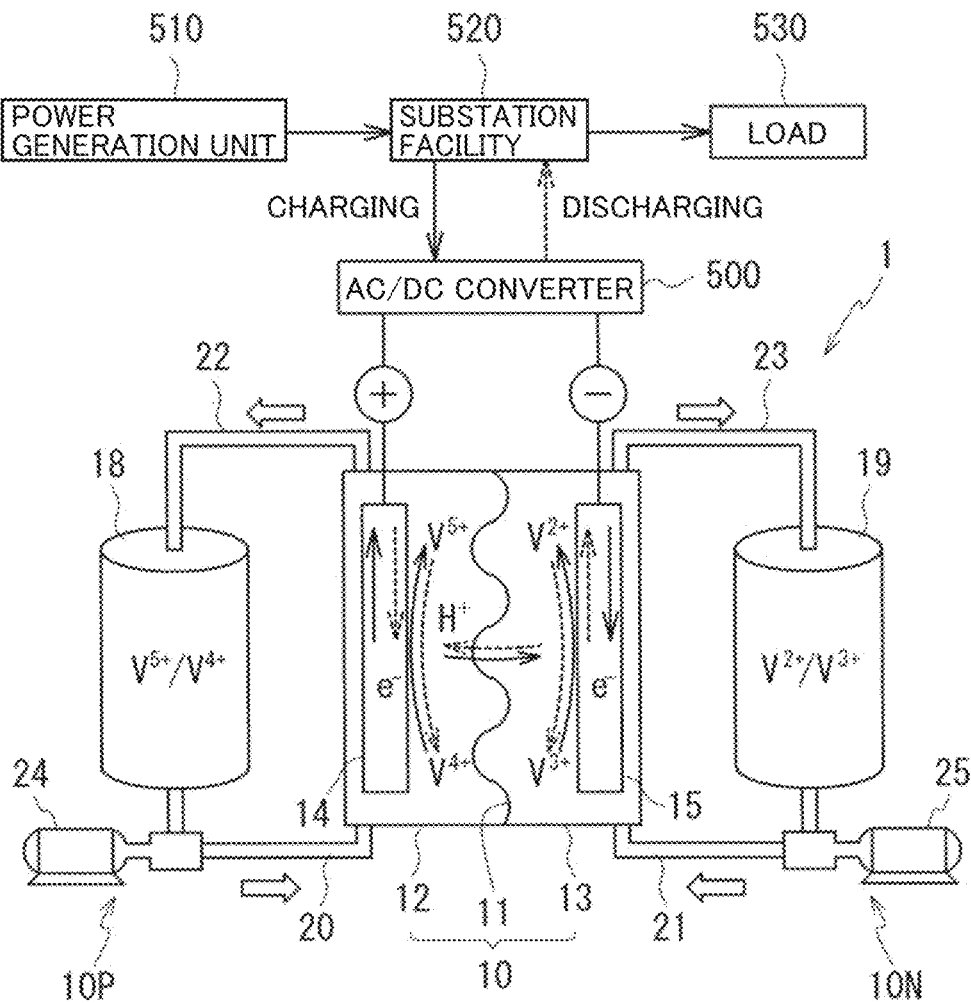
FIG. 4 is an operation principle diagram of the redox flow battery according to the embodiment.
Figure 5:
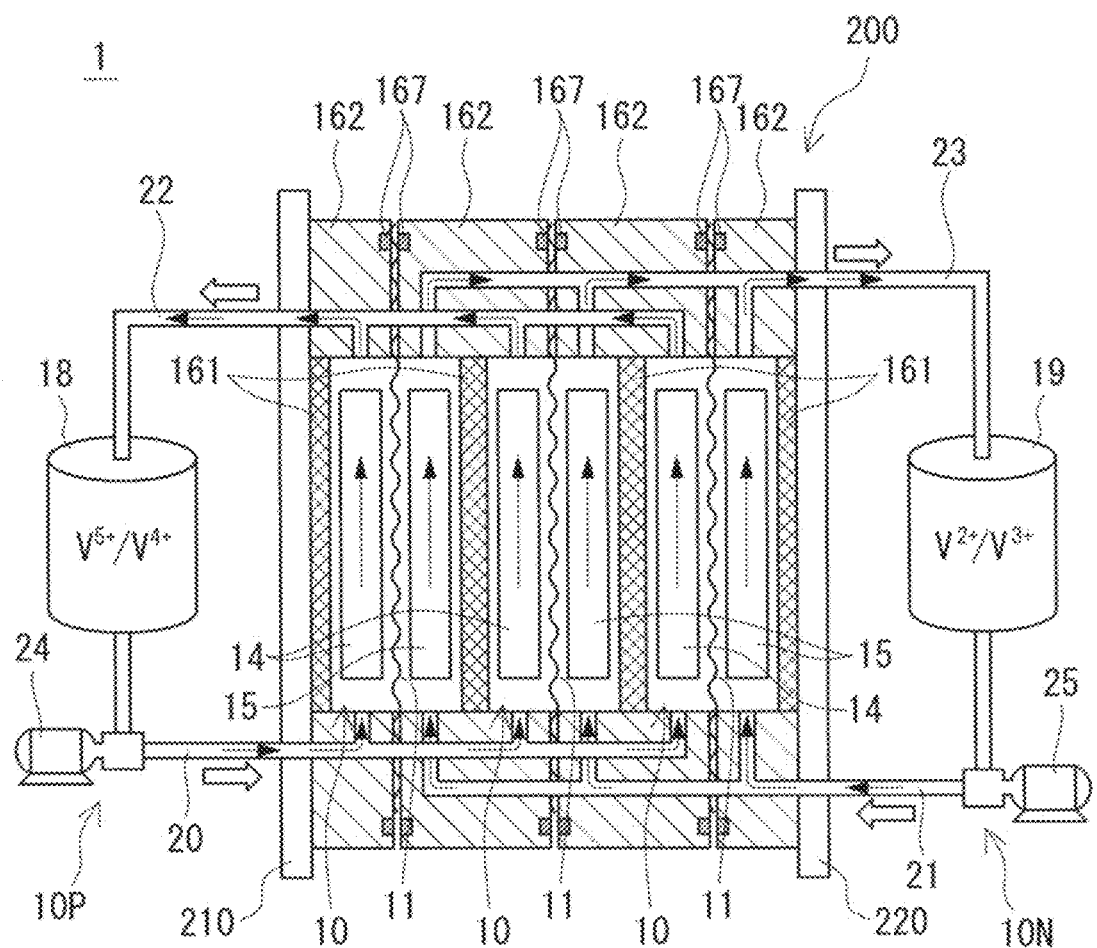
FIG. 5 is a schematic configuration diagram of the redox flow battery according to the embodiment.

A redox flow battery system (RF battery system) 1 according to the embodiment will be described with reference to FIGS. 1 to 11. As shown in FIGS. 4 and 5, RF battery system 1 includes a battery cell 10 and a circulation mechanism. Battery cell 10 includes a positive electrode 14, a negative electrode 15, and a membrane 11 interposed between positive electrode 14 and negative electrode 15. The circulation mechanism circulates an electrolyte in battery cell 10. One characteristic of RF battery system 1 according to the present embodiment is that at least one of positive electrode 14 and negative electrode 15 is composed of a specific electrode 100 (FIG. 1). Specifically, one characteristic of RF battery system 1 according to the present embodiment is that electrode 100 includes specific carbon fibers 110 (FIG. 3). Hereinafter, an overview and a basic configuration of RF battery system 1, and details of each component of RF battery system 1 according to the present embodiment will be described in this order.

[Overview of RF Battery System]

RF battery system 1 is charged with electric power generated by a power generation unit 510 and stores the electric power, and discharges the stored electric power and supplies the electric power to a load 530 (FIG. 4). RF battery system 1 is representatively connected between power generation unit 510 and load 530 with an AC/DC converter 500 and a transformer facility 520 interposed therebetween. Examples of power generation unit 510 include a photovoltaic power generation apparatus, a wind power generation apparatus, any other general power plant and the like. Examples of load 530 include an electric power consumer and the like. RF battery system 1 uses a positive electrode electrolyte and a negative electrode electrolyte. Each of the positive electrode electrolyte and the negative electrode electrolyte contains, as an active material, metal ions whose valence changes by oxidation reduction. Charging and discharging of RF battery system 1 are performed using a difference between an oxidation reduction potential of the ions contained in the positive electrode electrolyte and an oxidation reduction potential of the ions contained in the negative electrode electrolyte. In FIG. 4, a solid line arrow indicates charging, and a broken line arrow indicates discharging. RF battery system 1 is, for example, used for the load leveling application, the applications such as instantaneous voltage drop compensation and an emergency power supply, and the natural energy output leveling application for photovoltaic power generation, wind power generation and the like that are being introduced in large amounts.

[Basic Configuration of RF Battery System]

RF battery system 1 includes battery cell 10 separated into a positive electrode cell 12 and a negative electrode cell 13 by membrane 11 through which hydrogen ions transmit. Positive electrode cell 12 has positive electrode 14 built therein. A positive electrode circulation mechanism 10P causes the positive electrode electrolyte to circulate in positive electrode cell 12. Positive electrode circulation mechanism 10P includes a positive electrode electrolyte tank 18, a supply pipe 20, a discharge pipe 22, and a pump 24. Positive electrode electrolyte tank 18 stores the positive electrode electrolyte. Supply pipe 20 and discharge pipe 22 connect positive electrode cell 12 to positive electrode electrolyte tank 18. Pump 24 is provided midway along supply pipe 20. Similarly, negative electrode cell 13 has negative electrode 15 built therein. A negative electrode circulation mechanism 10N causes the negative electrode electrolyte to circulate in negative electrode cell 13. Negative electrode circulation mechanism 10N includes a negative electrode electrolyte tank 19, a supply pipe 21, a discharge pipe 22, and a pump 25. Negative electrode electrolyte tank 19 stores the negative electrode electrolyte. Supply pipe 21 and discharge pipe 23 connect negative electrode cell 13 to negative electrode electrolyte tank 19. Pump 25 is provided midway along supply pipe 21.

During operation in which charging and discharging are performed, the positive electrode electrolyte and the negative electrode electrolyte are supplied from positive electrode electrolyte tank 18 and negative electrode electrolyte tank 19 through supply pipe 20 and supply pipe 21 to positive electrode cell 12 and negative electrode cell 13 by pump 24 and pump 25, respectively. Then, the positive electrode electrolyte and the negative electrode electrolyte are discharged from positive electrode cell 12 and negative electrode cell 13 through discharge pipe 22 and discharge pipe 23 to positive electrode electrolyte tank 18 and negative electrode electrolyte tank 19, thereby circulating in positive electrode cell 12 and negative electrode cell 13, respectively. During standby in which charging and discharging are not performed, pump 24 and pump 25 are stopped and the positive electrode electrolyte and the negative electrode electrolyte are not circulated.

[Electrode]

Figure 6:
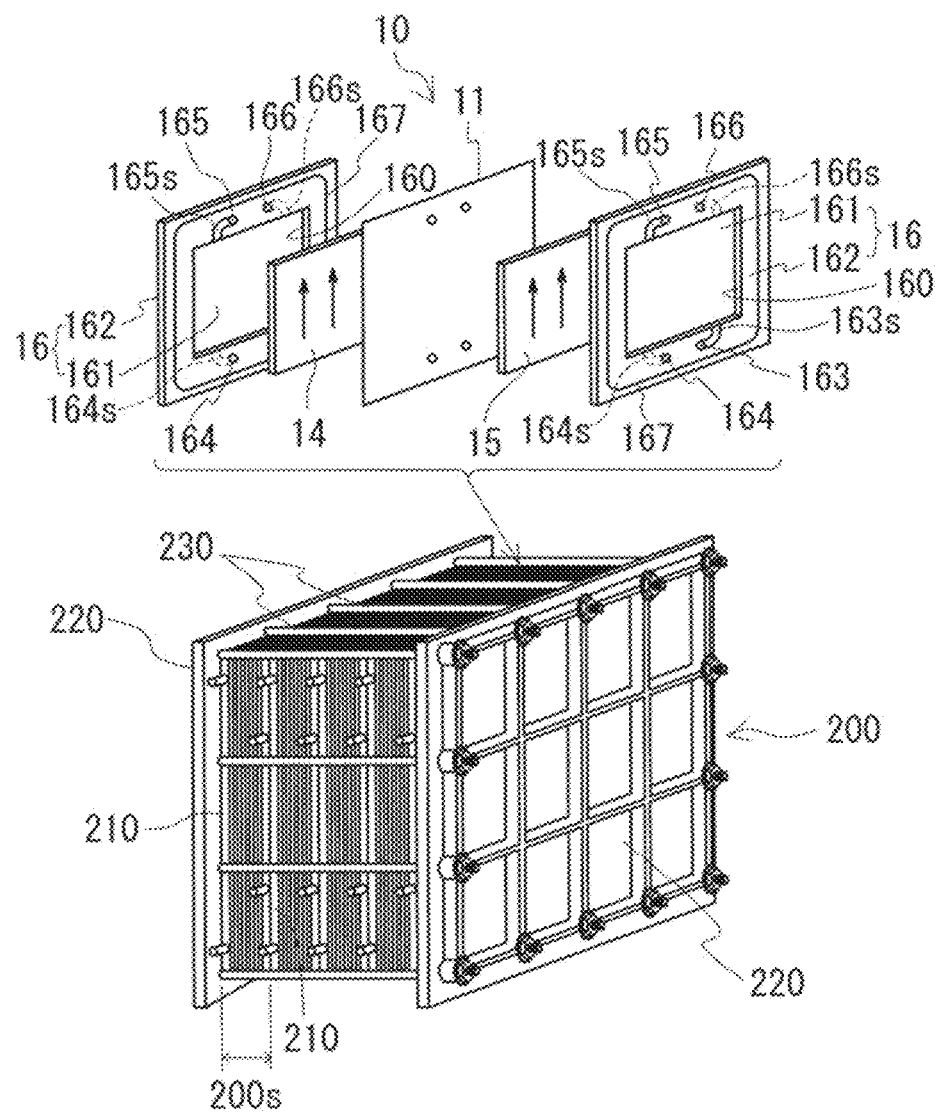
FIG. 6 is a schematic configuration diagram of a cell stack included in the redox flow battery according to the embodiment.

As described above, electrode 100 according to the present embodiment forms at least one of positive electrode 14 and negative electrode 15 (FIGS. 4 to 6). Electrode 100 includes a plurality of carbon fibers 110 (FIG. 2). Examples of types of elect axle 100 including the plurality of carbon fibers 110 include carbon felt, carbon cloth, carbon paper and the like. Some carbon fibers 110 have a first region 111 (FIG. 3). Although details will be described below, carbon fiber 110 having first region 111 is excellent in hydrophilicity and durability. Therefore, a higher ratio of carbon fibers 110 having first region 111 to all carbon fibers 110 included in electrode 100 is more preferable. This is because electrode 100 makes it easy to construct RF battery system 1 that is low in cell resistivity and usable for a long time.

(First Region)

Figure 7:
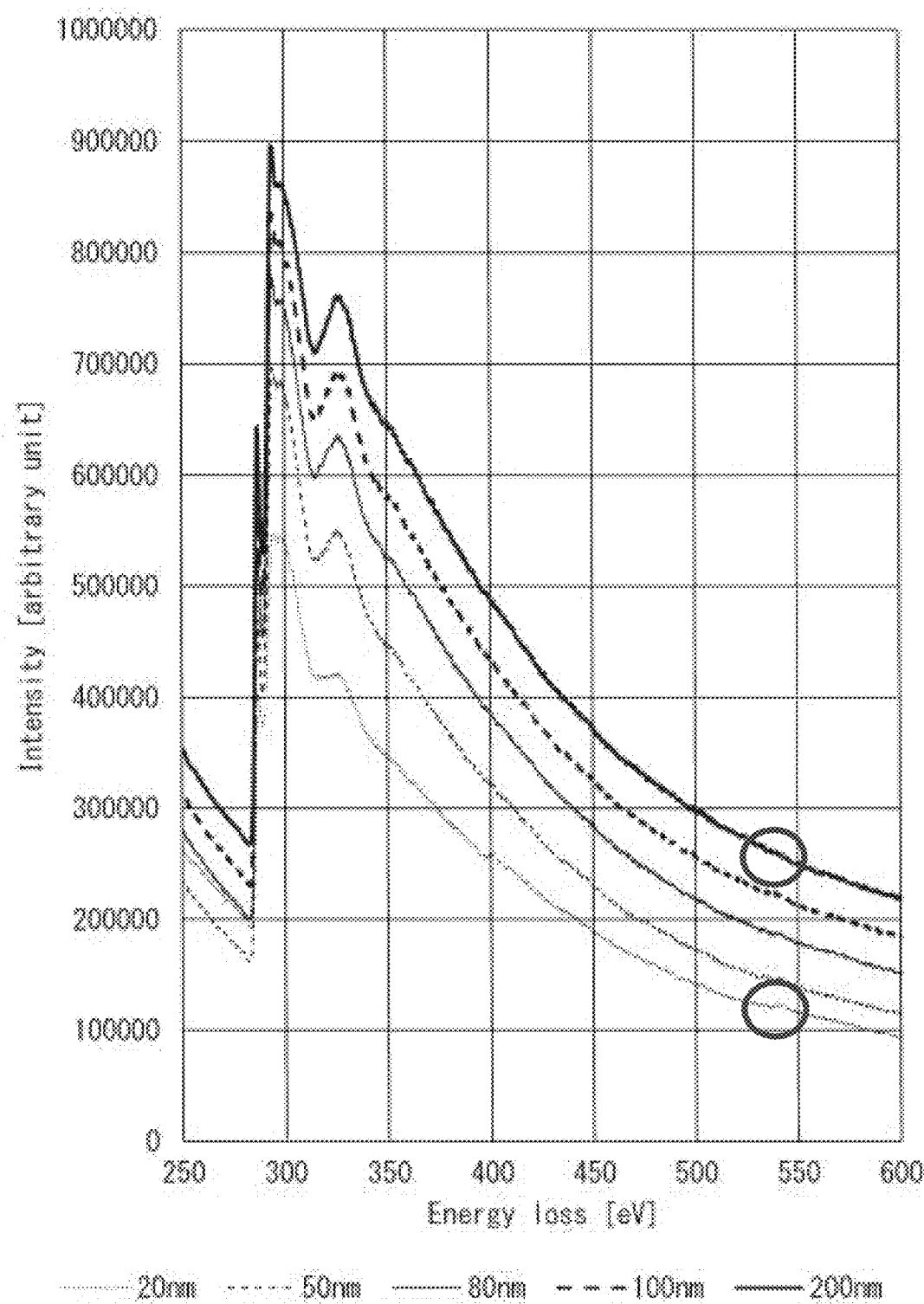
FIG. 7 is a graph showing energy loss spectra obtained by analyzing a carbon fiber of Sample No. 1 by electron energy loss spectroscopy.
Figure 8:
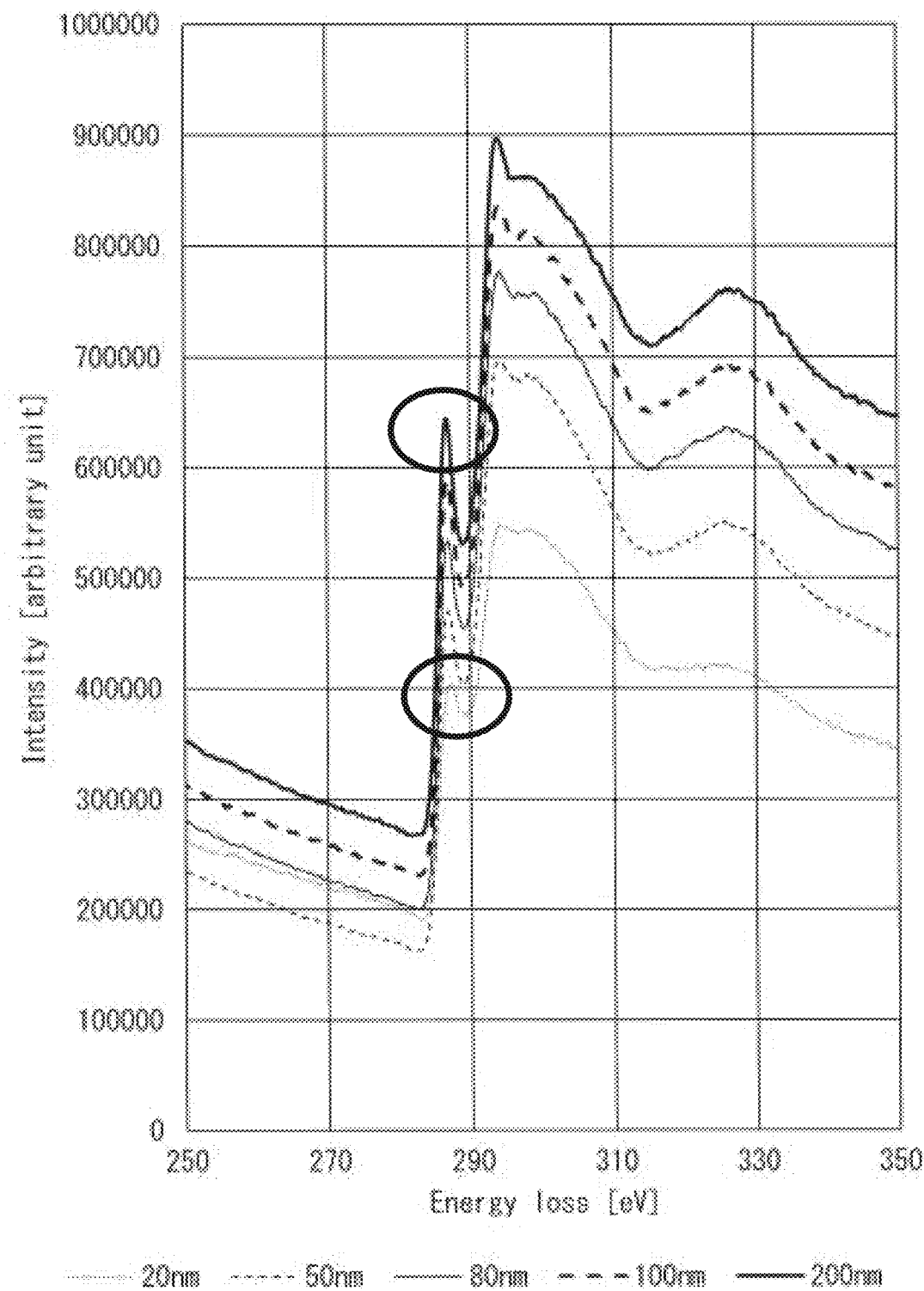
FIG. 8 is a graph showing the energy loss spectra in a range of 250 eV to 350 eV, of the graph in FIG. 7.
Figure 9:
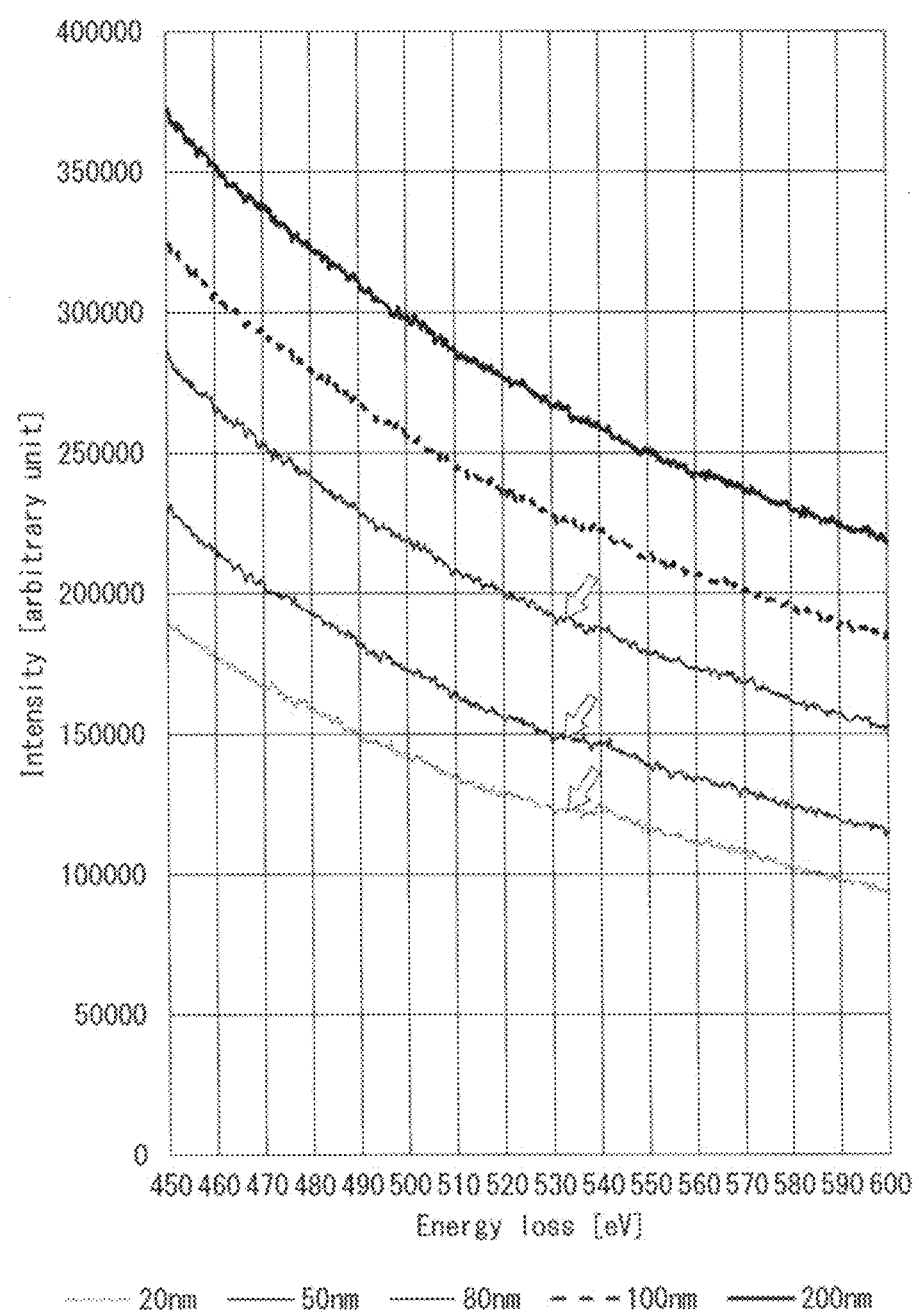
FIG. 9 is a graph showing the energy loss spectra in a range of 450 eV to 600 eV, of the graph in FIG. 7.

First region 111 has peaks both at oned 285 eV and around 530 eV in energy loss spectra (FIGS. 7 to 9). FIG. 7 is a graph showing five energy loss spectra obtained by analyzing a cross section of a carbon fiber of Sample No. 1 used in a below-described test example by electron energy loss spectroscopy (EELS). In the following description, the energy loss spectrum may be simply referred to as "spectrum". The cross section is a horizontal cross section orthogonal to a longitudinal direction of carbon fiber 110. Details of the graphs in FIGS. 7 to 9 will be described below.

Around 285 eV refers to equal to or more than 281 eV and equal to or less than 289 eV (FIGS. 7 and 8). Around 530 eV refers to equal to or more than 526 eV and equal to or less than 534 eV (FIGS. 7 and 9). The peak around 285 eV is a peak derived from a $\pi^*$ component. First region 111 having a peak around 530 eV means that first region 111 contains oxygen. Since first region 111 contains oxygen, first region 111 is excellent in hydrophilicity.

First region 111 is formed in a surface layer including a surface of carbon fiber 110 (FIG. 3). The surface of carbon fiber 110 refers to an outer circumferential surface. The surface layer refers to an area up to 10% of a diameter of carbon fiber 110 from the surface toward a center of carbon fiber 110. The center of carbon fiber 110 refers to a center of gravity of a region surrounded by a contour of the horizontal cross section of carbon fiber 110. When carbon fiber 110 has, for example, a circular outer shape, the center of carbon fiber 110 refers to the center of the circle.

Since first region 111 containing oxygen is provided in the surface layer of carbon fiber 110, the surface layer is excellent in hydrophilicity. Therefore, carbon fiber 110 can come into good contact with an electrolyte. Thus, electrode 100 including this carbon fiber 110 makes it easy to construct RF battery system 1 that is low in cell resistivity. In addition, since first region 111 having a highly crystalline carbon crystal structure is provided in the surface layer of carbon fiber 110, first region 111 is excellent in durability. Being excellent in durability means that carbon fiber 110 difficult to become thin as a result of charging and discharging of RF battery system 1. Accordingly, electrode 100 including this carbon fiber 110 makes it easy to construct RF battery system 1 that is usable for a long time.

Furthermore, first region 111 may be formed in an area up to 8% of the diameter of carbon fiber 110 from the surface toward the center of carbon fiber 110, and particularly, in an area up to 5% of the diameter of carbon fiber 110 from the surface toward the center of carbon fiber 110.

First region 111 preferably further has a peak around 291 eV in the spectra (FIGS. 7 and 8). Around 291 eV refers to equal to or more than 287 eV and equal to or less than 295 eV. The peak around 291 eV in a peak derived from a $\sigma^*$ component. First region 111 having a peak around 291 eV means that first region 111 has a highly crystalline carbon crystal structure. Therefore, first region 111 is excellent in durability. Accordingly, electrode 100 makes it easier to construct RF battery system 1 that is usable for a long time.

In first region 111, a ratio h2/h1 of a height h2 of the peak around 291 eV to a height h1 of the peak around 285 eV is preferably equal to or more than 1.1 and equal to or less than 2 (FIGS. 7 and 8). This may be because above-described ratio h2/h1 in first region 111 satisfies the above-described range, and thus, the crystallinity of the carbon crystal structure in first region 111 is higher. Therefore, electrode 100 makes it easier to construct RF battery system that is usable for a long time. Above-described ratio h2/h1 is further preferably equal to or more than 1.5 and equal to or less than 1.7. Each of heights h1 and h2 of the peaks refers to a distance to a top of the peak in each of the spectrum around 285 eV and the spectrum around 291 eV when a height of a spectrum around 280 eV is defined as zero. Around 280 eV refers to equal to or more than 276 eV and equal to or less than 284 eV.

When a total area of an area S1 (FIG. 10) in a range of 340 eV to 380 eV and an area S2 (FIG. 11) in a range of 550 eV to 580 eV is defined as 100% at an arbitrary location of first region 111, a ratio of area S2 to the total area is preferably equal to or more than 0.1% and equal to or less than 30%. Since the ratio of area S2 in first region 111 is equal to or more than 0.1%, first region 111 contains a sufficient amount of oxygen, and thus, first region 111 is excellent in hydrophilicity. Since the ratio of area S2 in first region 111 is equal to or less than 30%, first region 111 does not contain an excessive amount of oxygen, and thus, first region 111 is excellent in durability. The ratio of area S2 in first region 111 is further preferably equal to or more than 1% and equal to or less than 25%, and particularly preferably equal to or more than 2% and equal to or less than 20%. A method for obtaining area S1 and area S2 will be described in detail below.

(Second Region)

Carbon fiber 110 preferably further has a second region 112. Second region 112 has no peak around 530 eV and has a peak around 285 eV in the spectra. That is, second region 112 does not contain oxygen and has a highly crystalline carbon crystal structure. Since second region 112 does not contain oxygen, the crystallinity of the carbon crystal structure in second region 112 is higher than that in first region 111. Therefore, second region 112 is more excellent in durability than first region 111. Second region 112 preferably further has a peak around 291 eV. This is because the durability of second region 112 is more excellent. Second region 112 is formed closer to the center than first region 111. Similarly to first region 111, in second region 112, ratio h2/h1 of height h2 of the peak around 291 eV to height h1 of the peak around 285 eV is preferably more than 1.3 and less than 2. Above-described ratio h2/h1 is particularly preferably equal to or more than 1.5 and equal to or less than 1.7.

(Average Diameter)

An average diameter of carbon fibers 110 is preferably equal to or more then 1 μm and equal to or leas than 20 μm, for example. When the average diameter of carbon fibers 110 is equal to or more than 1 μm, it is easy to secure the strength of carbon fibers 110 themselves. When the average diameter of carbon fitters 110 is equal to or less than 20 μm, a surface area of carbon fibers 110 per unit weight can be increased, and thus, it is easy to sufficiently secure an area where the battery reaction occurs. The average diameter of carbon fibers 110 is further preferably equal to or more than 3 μm and equal to or less than 18 μm, and particularly preferably equal to or more than 5 μm and equal to or less than 16 μm. The average diameter of carbon fibers 110 is obtained by measuring circle equivalent diameters of 10 or more carbon fibers 110 and taking an average thereof. Circle equivalent diameters at one or more locations are measured per one carbon fiber 110. Circle equivalent diameters at a plurality of locations in the longitudinal direction may be obtained per one carbon fiber 110. The circle equivalent diameter refers to an equal area circle equivalent diameter obtained by true circle conversion of a horizontal cross-sectional area of carbon fiber 110.

(Manufacturing)

Carbon fiber 110 having first region 111 is manufactured, for example, by preparing a carbon fiber having a low content of impurities and subjecting the carbon fiber to heat treatment. Examples of the impurities include a metal element such as sodium or calcium. The heat treatment temperature is, for example, equal to or higher than 300° C. and equal to or lower than 800° C. The heat treatment time is, for example, equal to or longer than 10 minutes and equal to or shorter than 120 minutes. The heat treatment atmosphere is, for example, the atmosphere containing oxygen, such as the air. The heat treatment temperature refers to a temperature of the carbon fiber itself. The heat treatment time refers to the time for which the carbon fiber is kept at the above-described temperature.

[Cell Stack]

As shown in FIG. 5 and the lower part of FIG. 6, battery cell 10 is normally formed inside a structure called "cell stack 200". Cell stack 200 is composed of a stacked body called "substack 200s", two end plates 220, and a tightening mechanism 230 (lower part of FIG. 6). Two end plates 220 sandwich the stacked body from both sides thereof. Tightening mechanism 230 tightens both end plates 220. The number of substack 220s may be singular or plural. The lower part of FIG. 6 shows, by way of example, the configuration including a plurality of substacks 200s. As shown in FIG. 5 and the upper part of FIG. 6, substack 200s is formed by stacking a cell frame 16, positive electrode 14, membrane 11, and negative electrode 15 in this order a plurality of times, and supply and discharge plates 210 (lower pan of FIG. 6) are arranged at both ends of the stacked body.

[Cell Frame]

Cell frame 16 includes a bipolar plate 161 and a frame body 162. Frame body 162 surrounds an outer perimeter edge of bipolar plate 161. A surface of bipolar plate 161 and an inner perimeter surface of frame body 162 form a recessed portion 160 of cell frame 16 where positive electrode 14 or negative electrode 15 is arranged. One battery cell 10 is formed between bipolar plates 161 of adjacent cell frames 16. Positive electrode 14 and negative electrode 15 of adjacent battery cells 10 are arranged on the front surface and the back surface of bipolar plate 161. That is, positive electrode cell 12 and negative electrode cell 13 of adjacent battery cells 10 are formed on the front surface and the back surface of bipolar plate 161.

Cell frame 16 includes an intermediate cell frame and an end cell frame. The intermediate cell frame is arranged between adjacent battery cells 10 of the above-described stacked body (FIGS. 4 to 6). The end cell frame is arranged at each of both ends of the above-described stacked body. In the intermediate cell frame, positive electrode 14 of one battery cell 10 and negative electrode 15 of the other battery cell 10 are in contact with the front surface and the back surface of bipolar plate 161. In the end cell frame, one of positive electrode 14 and negative electrode 15 of battery cell 10 is in contact with one surface of bipolar plate 161, and there is no electrode on the other surface of bipolar plate 161. Both the intermediate cell frame and the end cell frame have the same configuration of the front surface and the back surface of cell frame 16.

Frame body 162 supports bipolar plate 161. Frame body 162 forms therein a region for battery cell 10. Frame body 162 has a rectangular frame shape. That is, recessed portion 160 has a rectangular opening shape. Frame body 162 includes a liquid supply-side piece, and a liquid discharge-side piece that faces the liquid supply-side piece. Assuming that a direction in which the liquid supply-side piece and the liquid discharge-side piece face each other when cell frame 16 is seen in a plan view is defined as a longitudinal direction, and a direction orthogonal to the longitudinal direction is defined as a horizontal direction, the liquid supply-side piece is located on the lower side in the above-described longitudinal direction, and the liquid discharge-side piece is located on the upper side in the above-described longitudinal direction. The liquid supply-side piece includes liquid supply manifolds 165 and 164 and liquid supply slits 163s and 164s that supply the electrolyte to the inside of battery cell 10. The liquid discharge-side piece includes liquid discharge manifolds 165 and 166 and liquid discharge slits 165s and 166s that discharge the electrolyte to the outside of battery cell 10. The electrolyte flows in a direction from the lower side in the above-described longitudinal direction to the upper side in the above-described longitudinal direction of frame body 162.

The liquid supply-side piece may have a liquid supply adjusting unit (not shown) at an inner edge thereof. The liquid supply adjusting unit diffuses, along the inner edge of the liquid supply-side piece, the electrolyte flowing through liquid supply slits 163s and 164s. The liquid discharge-side piece may have a liquid discharge adjusting unit (not shown) at art inner edge thereof. The liquid discharge adjusting unit collects the electrolyte flowing through positive electrode 14 (negative electrode 15) and causes the electrolyte to flow through liquid discharge slits 165s and 166s.

A flow of each electrode electrolyte in cell frame 16 is as follows. The positive electrode electrolyte flows from liquid supply manifold 163 through liquid supply slits 163s and 164s formed in the liquid supply-side piece on the one surface side of frame body 162 to positive electrode 14. As shown by an arrow in the upper part of FIG. 6, the positive electrode electrolyte flows from the lower side to the upper side of positive electrode 14. The positive electrode electrolyte is discharged to liquid discharge manifolds 165 and 166 through liquid discharge slits 165s and 166s formed in the liquid discharge-side piece. The supply and discharge of the negative electrode electrolyte is similar to that of the positive electrode electrolyte, except that they are performed on the other surface side of frame body 162.

In each frame body 162, an annular seal member 167 is arranged in an annular seal groove. Seal member 167 suppresses leakage of the electrolyte from battery cell 10. An O-ring, a flat packing or the like can, for example, be used as seal member 167.

[Electrolyte]

The positive electrode electrolyte and the negative electrode electrolyte are supplied to positive electrode 14 and negative electrode 15 in a circulating manner by positive electrode circulation mechanism 10P and negative electrode circulation mechanism 10N, respectively. As a result of this circulation, charging and discharging are performed with the valence change reaction of the active material ions contained in the positive electrode electrolyte and the negative electrode electrolyte.

The active material of the positive electrode electrolyte contains one or more selected from the group consisting of manganese ions, vanadium ions, iron ions, polyacid, a quinone derivative, and amine. The active material of the negative electrode electrolyte contains one or mote selected from the group consisting of titanium ions, vanadium ions, chromium ions, polyacid, a quinone derivative, and amine. FIGS. 4 and 5 show, by way of example, the vanadium (V) ions as the ions contained in the positive electrode electrolyte and the negative electrode electrolyte.

A concentration of the positive electrode active material and a concentration of the negative electrode active material can be selected as appropriate. At least one of the concentration of the positive electrode active material and the concentration of the negative electrode active material is, for example, equal to or mote than 0.3 mol/L and equal to or less than 5 mol/L. When the above-described concentration is equal to or more than 0.3 mol/L, a sufficient energy density as a large-capacity storage battery can be achieved. The sufficient energy density is, for example, approximately 10 kWh/m$^3$. The higher the above-described concentration is, the higher the energy density is. The above-described concentration may further be equal to or more than 0.5 mol/L or equal to or more than 1.0 mol/L, and particularly equal to or more than 1.2 mol/L or equal to or more than 1.5 mol/L. When the above-described concentration is equal to or less than 5 mol/L, it is easy to increase the solubility to a solvent. The above-described concentration may further be equal to or less than 2 mol/L. The electrolyte that satisfies this concentration is excellent in manufacturability.

Examples of the solvent of the electrolyte include an aqueous solution containing one or more acids or acid salts selected from the group consisting of sulfuric acid, phosphoric acid, nitric acid, and hydrochloric acid.

Function and Effect

Since electrode 100 includes carbon fibers 110 excellent in hydrophilicity and durability, RF battery system 1 according to the present embodiment is low in cell resistivity and usable tor a long time.

Test Example

In a test example, hydrophilicity and durability of carbon fibers included in an electrode were examined.

[Sample No. 1]

Carbon felt made of a plurality of carbon fibers was used as an electrode of Sample No. 1. The electrode was produced by preparing a fiber aggregate made of a plurality of carbon fibers, and subjecting the fiber aggregate to heat treatment. The prepared carbon fibers had a low content of impurities. The heat treatment was performed by heating the carbon fibers to 600° C. under the air atmosphere and keeping the temperature for 30 minutes.

[Sample No. 2]

An electrode of Sample No. 2 was produced similarly to Sample No. 1, except that the heat treatment was changed. Specifically, the carbon fibers were heated to 550° C. and the temperature was kept for two hours.

[Sample No. 101]

An electrode of Sample No. 101 was produced similarly to Sample No. 1, except that the fiber aggregate was not subjected to heat treatment.

[Sample No. 102]

An electrode of Sample No. 102 was produced similarly to Sample No. 1, except that carbon fibers having a high content of impurities were used.

[EELS Analysis]

The carbon fibers included in the electrode of each sample were analyzed by EELS. First, one carbon fiber was extracted from the electrode of each sample. Each extracted carbon fiber had a diameter of 10 µm. The extracted carbon fiber was embedded in a resin. While removing the resin by focused ion beam processing, a horizontal cross seed on of the carbon fiber embedded in the resin was produced. The horizontal cross section of the carbon fiber was analyzed using an apparatus, thereby obtaining an energy loss spectrum of the carbon fiber. The used apparatus was a transmission electron microscope manufactured by JEOL Ltd.

FIGS. 7 to 11 representatively show the energy loss spectra of the carbon fiber of Sample No. 1. FIG. 7 is a graph showing five energy loss spectra of the carbon fiber of Sample No. 1. The horizontal axis of the graph in FIG. 7 represents the energy loss (eV). The vertical axis of the graph in FIG. 7 represents the intensity (arbitrary unit). The dotted line, the thin broken line, the thin line, the thick broken line, and the thick line in FIG. 7 represent a spectrum at a location of 20 nm, a spectrum at a location of 50 nm, a spectrum at a location of 80 nm, a spectrum at a location of 100 nm, and a spectrum at a location of 200 nm from a surface (outer circumferential surface) toward a center of the carbon fiber in the horizontal cross section of the carbon fiber, respectively. FIG. 8 shows a spectrum in a range of 250 eV to 350 eV, of the graph in FIG. 7. FIG. 9 shows a spectrum in a range of 450 eV to 600 eV, of the graph in FIG. 7. For convenience in explanation, FIG. 9 shows a position of the peak around 530 eV by a hollow arrow.

[Position of Peak]

As shown in FIGS. 7 to 9, it was found that the carbon fiber of Sample No. 1 had peaks both around 285 eV and around 530 eV at the location of 20 nm, the location of 50 nm and the location of 80 nm from the surface toward the center. It was also found that the carbon fiber of Sample No. 1 had a peak around 285 eV and had no peak around 530 eV at the location of 100 nm and the location of 200 nm from the surface toward the center. Based on these results, it was found that in the carbon fiber of Sample No. 1, the first region having peaks both around 285 eV and around 530 eV was provided up to 10% of the diameter of the carbon fiber. It was also found that in the carbon fiber of Sample No. 1, the second region having no peak around 530 eV and having a peak around 285 eV was provided closer to the center than the first region.

As shown in FIGS. 7 and 8, it was also found that the carbon fiber of Sample No. 1 further had a peak around 291 eV at all of the above-described location of 20 nm, the above-described location of 50 nm, the above-described location of 80 nm, the above-described location of 100 nm, and the above-described location of 200 nm. That is, it was found that the first region and the second region of the carbon fiber of Sample No. 1 further had a peak around 291 eV.

Although not shown, the results of EELS analysis of the carbon fibers of Sample No. 2, Sample No. 101 and Sample No. 102 are as follows.

It was found that the energy loss spectrum of the carbon fiber of Sample No. 2 was similar to that of Sample No. 1. That is, it was found that in the carbon fiber of Sample No. 2, the first region having peaks both around 285 eV and around 530 eV was provided up to 10% of the diameter of the carbon fiber. It was also found that in the carbon fiber of Sample No. 2, the second region having no peak around 530 eV and having a peak around 285 eV was provided closer to the center than the first region. It was found that the first region and the second region of the carbon fiber of Sample No. 2 further had a peak around 291 eV.

It was found that the energy loss spectra of Sample No. 101 and Sample No. 102 were different from that of Sample No. 1.

It was found that up to 10% of the diameter of the carbon fiber from the surface toward the center, the carbon fiber of Sample No. 101 had peaks both around 285 eV and around 291 eV. It was also found that up to 10% of the diameter of the carbon fiber from the surface toward the center, the carbon fiber of Sample No. 101 had no peak around 530 eV. It was also found that closer to the center than the location up to 10% of the diameter of the carbon fiber from the surface toward the center, the carbon fiber of Sample No. 101 had peaks both around 285 eV and around 291 eV and had no peak mound 539 eV.

It was found that up to 10% of the diameter of the carbon fiber from the surface toward the center, the carbon liber of Sample No. 102 had peaks around 285 eV, around 291 eV and around 539 eV. It was also found that closer to the center than the location up to 10% of the diameter of the carbon fiber front the surface toward the center, the carbon fiber of Sample No. 102 had peaks around 285 eV, around 291 eV and around 530 eV.

[Ratio h2/h1 of Heights of Peaks]

As to the first region of the carbon fiber of Sample No. 1, ratio h2/h1 of height h2 of the peak around 291 eV to height h1 of the peak around 285 eV was obtained from FIGS. 7 and 8. Although not shown, above-described ratio h2/h1 was also obtained similarly to Sample No. 1, as to the first region of the carbon fiber of Sample No. 2, and the carbon fibers of Sample No. 101 and Sample No. 102. The results of above-described ratio h2/h1 at the above-described location of 50 nm of the carbon fibers of the samples are shown in Table 1.

[Ratio of Area S2]

At an arbitrary location of the first region of the carbon fiber of Sample No. 1, area S1 in the range of 340 eV to 380 eV (FIG. 10) and area S2 in the range of 550 eV to 580 eV (FIG. 11) were obtained from FIGS. 10 and 11 as described below. Then, a ratio (%) of area S2 when a total of area S1 and area S2 was defined as 100% was obtained.

Figure 10:
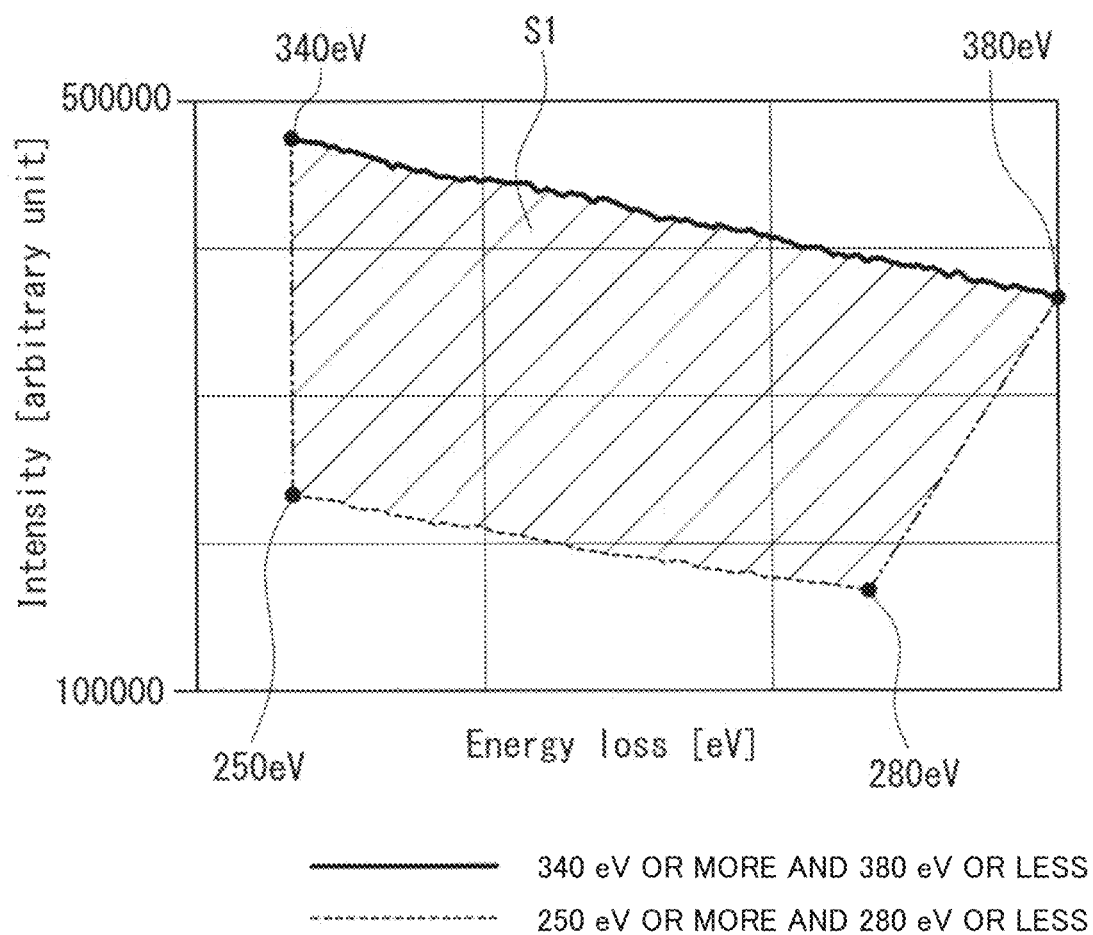
FIG. 10 is an explanatory diagram for explaining a method for obtaining an area S1 in a range of 340 eV to 380 eV in a first region.

In FIG. 10, the range of 340 eV to 380 eV of the spectrum at the location of 50 nm shown in FIG. 7 is indicated by a solid line, and the range of 250 eV to 280 eV is indicated by a broken line. Here, a point of 340 eV and a point of 250 eV are shown to be aligned with each other on the horizontal axis of the graph. As shown by a two-dot chain line, the point of 340 eV and the point of 250 eV are connected by a straight line, and a point of 380 eV and a point of 280 eV are connected by a straight line. As shown by hatching in FIG. 10, area S1 refers to an area of a region surrounded by the spectrum in the range of 340 eV to 380 eV and the spectrum in the range of 250 eV to 280 eV.

Figure 11:
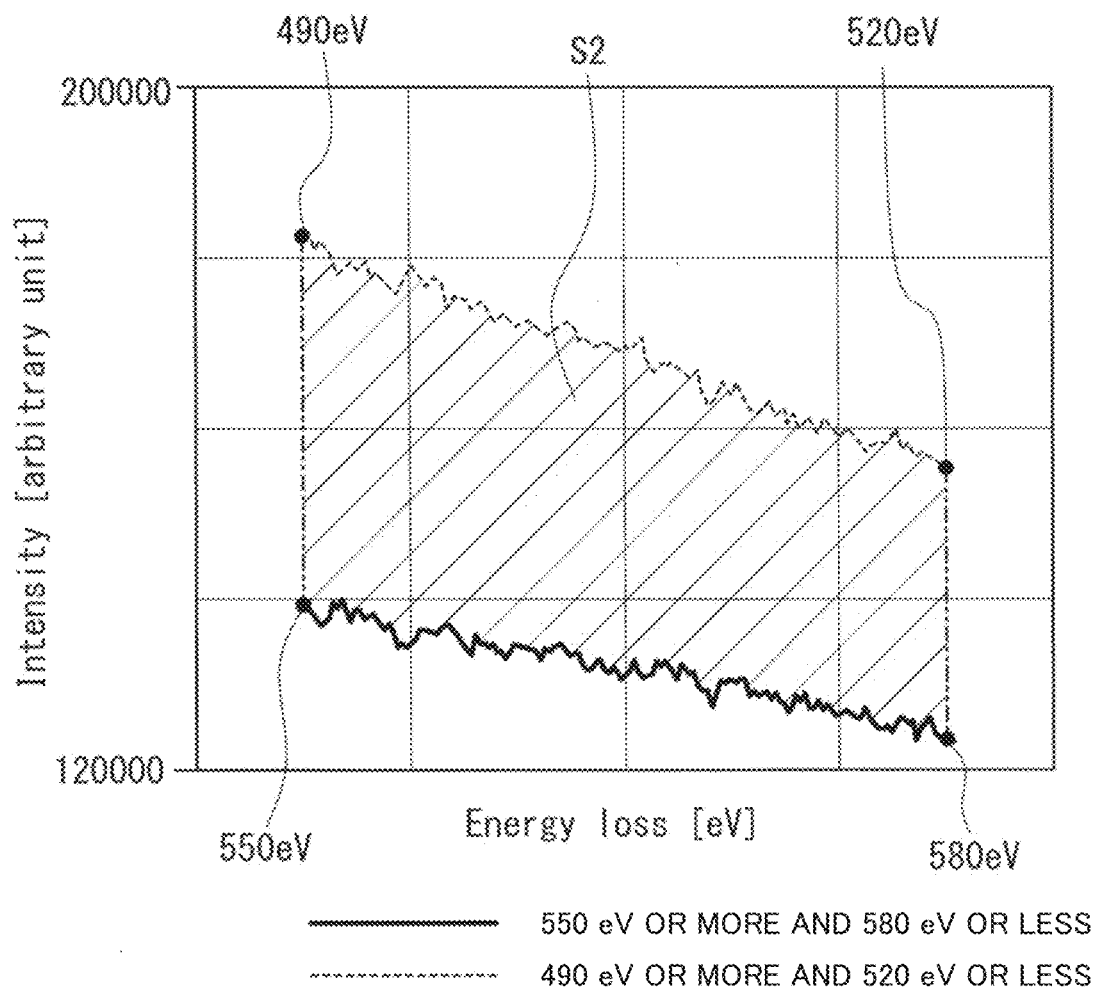
FIG. 11 is an explanatory diagram for explaining a method for obtaining an area S2 in a range of 550 eV to 580 eV in the first region.

In FIG. 11, the range of 550 eV to 580 eV of the spectrum at the location of 50 nm shown in FIG. 7 is indicated by a solid line, and the range of 490 eV to 520 eV is indicated by a broken line. Here, a point of 550 eV and a point of 490 eV are shown to be aligned with each other and a point of 580 eV and a point of 520 eV are shown to be aligned with each other on the horizontal axis of the graph. As shown by a two-dot chain line, the point of 550 eV and the point of 490 eV are connected by a straight line, and the point of 580 eV and the point of 520 eV are connected by a straight line. As shown by hatching in FIG. 11, area S2 refers to an area of a region surrounded by the spectrum in the range of 550 eV to 580 eV and the spectrum in the range of 490 eV to 520 eV.

Although not shown, the ratio of area S2 was also obtained similarly to Sample No. 1, as to the first region of the carbon fiber of Sample No. 2 and the carbon fiber of Sample No. 102. As to Sample No. 1, Sample No. 2 and Sample No. 102, the ratio of area S2 at the above-described location of 50 nm of the carbon fiber and the ratio of area S2 at a location of 2000 nm from the surface toward the center are shown in Table 1. Since Sample No. 101 has no peak around 530 eV, the ratio of area S2 is zero.

[Evaluation of Hydrophilicity]

The hydrophilicity of the carbon fiber was evaluated by producing a single cell battery using the electrode of each sample, and measuring the cell resistivity ($\Omega \cdot cm^2$). The lower the cell resistivity was, the more excellent the hydrophilicity of the carbon fiber was. The single cell battery was composed of a battery element including one positive electrode cell and one negative electrode cell. The single cell battery was formed by arranging a positive electrode and a negative electrode on both sides of one membrane, and sandwiching the electrodes between cell frames including bipolar plates. A reaction area of each electrode was 9 cm$^2$. A vanadium sulfate solution was used as each of the positive electrode electrolyte and the negative electrode electrolyte. The vanadium sulfate solution had a vanadium concentration of 1.7 M (mol/L). The produced single cell battery of each sample was subjected to charging and discharging at a constant current having a current density of 70 mA/cm$^2$. In this test, a plurality of cycles of charging and discharging were performed. That is, in this test, switching from charging to discharging was informed when a preset switching voltage was reached, and switching from discharging to charging was performed when a preset switching voltage was reached. After charging and discharging, the cell resistivity was obtained for each sample. The cell resistivity was calculated in accordance with [{(Vc−Vd)/2}/I]×S. Vc represents an intermediate voltage at the time of charging. Vd represents an intermediate voltage at the time of discharging. The intermediate voltage refers to a voltage value at an intermediate time point of a time period from the start to the end of charging or discharging. I represents a current value. S represents an electrode area. The results are shown in Table 1.

[Evaluation of Durability]

The durability of the carbon fiber was evaluated by immersing the carbon fiber forming the electrode of each sample in the electrolyte, and obtaining a weight decrease rate from the weights of the carbon fiber before and after immersion. The lower the weight decrease rate was, the more excellent the durability of the carbon fiber was. One carbon fiber was extracted from the electrode of each sample and immersed in the electrolyte. A vanadium sulfate solution having a vanadium concentration of 1.7 M (mol/L) was used as the electrolyte. The number of days of immersion was set at 30 days. The weights of the carbon fiber before and after immersion were measured and the weight decrease rate was obtained. The weight decrease rate was calculated in accordance with {(weight of carbon fiber before immersion−weight of carbon fiber after immersion)/weight of carbon fiber before immersion}×100. The results are shown in Table 1. "Good" in Table 1 means that the weight decrease rate is equal to or less than 1%. "Bad" in Table 1 means that the weight decrease rate is more than 1%.

TABLE 1

| Sample No. | Location of 50 nm h2/h1 | Location of 50 nm ratio of S2 (%) | Location of 2000 nm ratio of S2 (%) | Hydrophilicity cell resistivity ($\Omega \cdot cm^2$) | Durability |
|---|---|---|---|---|---|
| 1 | 1.6 | 4 | 0 | 0.6 | Good |
| 2 | 1.4 | 5 | 0 | 0.7 | Good |
| 101 | 1.5 | 0 | 0 | 1.1 | Good |
| 102 | 1.8 | 8 | 3 | 0.6 | Bad |

As shown in Table 1, the cell resistivity of the carbon fibers of Sample No. 1 and Sample No. 2 was equal to or less than 1 $\Omega \cdot cm^2$. The weight decrease rate of the carbon fibers of Sample No. 1 and Sample No. 2 was equal to or less than 1%. Specifically, the weight decrease rate of the carbon fibers of Sample No. 1 and Sample No. 2 was 0%. Based on these results, it was found that the carbon fibers of Sample No. 1 and Sample No. 2 were excellent in hydrophilicity and durability.

As shown in Table 1, the cell resistivity of the carbon fiber of Sample No. 101 was more than 1 $\Omega \cdot cm^2$. The weight decrease rate of the carbon fiber of Sample No. 101 was equal to or less than 1%. Specifically, the weight decrease rate of the carbon fiber of Sample No. 101 was 0%. Based on these results, it was found that the carbon fiber of Sample No. 101 was excellent in durability but inferior in hydrophilicity.

As shown in Table 1, the cell resistivity of the carbon fiber of Sample No. 102 was equal to or leas than 1 $\Omega \cdot cm^2$. The weight decrease rate of the carbon fiber of Sample No. 102 was mote than 1%. Specifically, the weight decrease rate of the carbon fiber of Sample No. 102 was 5%. Based on these results, it was found that the carbon fiber of Sample No. 102 was excellent in hydrophilicity but inferior in durability.

The present invention is not limited to these examples. The present invention is defined by the terms of the claims, end is intended to include any modifications within the scope and meaning equivalent to the terms of the claims.

REFERENCE SIGNS LIST 1 redox flow battery system (RF battery system)
100 electrode
  110 carbon fiber
    111 first region
    112 second region
10 battery cell
11 membrane
12 positive electrode cell
  14 positive electrode
13 negative electrode cell
  15 negative electrode
16 cell frame
  160 recessed portion
  161 bipolar plate
  162 frame body
  163, 164 liquid supply manifold
  163s, 164s liquid supply slit
  165, 166 liquid discharge manifold
  165s, 166s liquid discharge slit
  167 seal member
10P positive electrode circulation mechanism
10N negative electrode circulation mechanism
18 positive electrode electrolyte tank
19 negative electrode electrolyte tank
20, 21 supply pipe 22, 23 discharge pipe
24, 25 pump
200 cell stack
200s sub stack
210 supply and discharge plate
220 end plate
230 tightening mechanism
500 AC/DC converter
510 power generation unit
520 transformer facility
530 load

The invention claimed is:

1. An electrode comprising a carbon fiber, wherein
the carbon fiber has a first region including a surface of the carbon fiber,
when a cross section of the carbon fiber is analyzed by electron energy loss spectroscopy, the first region has peaks both around 285 eV and around 530 eV,
the first region is provided up to 10% of a diameter of the carbon fiber from the surface toward a center,
the size of the peak around 285 eV against the intensity before and after 285 eV is larger at 200 nm than at 20 nm, and
the size of the peak around 530 eV against the intensity before and after 530 eV is larger at 20 nm than at 200 nm.

2. The electrode according to claim 1, wherein
the carbon fiber has a second region closer to the center than the first region, and
the second region has no peak around 530 eV and has a peak around 285 eV.

3. The electrode according to claim 2, wherein
the first region and the second region further have a peak around 291 eV.

4. The electrode according to claim 3, wherein
in the first region, a ratio $h_2/h_1$ of a height $h_2$ of the peak around 291 eV to a height $h_1$ of the peak around 285 eV is equal to or more than 1.1 and equal to or less than 2.

5. The electrode according to claim 1, wherein
when a total area of an area $S_1$ in a range of 340 eV to 380 eV and an area $S_2$ in a range of 550 eV to 580 eV is defined as 100% at an arbitrary location of the first region, a ratio of the area $S_2$ to the total area is equal to or more than 0.1% and equal to or less than 30%.

6. A battery cell comprising the electrode as recited in claim 1.

7. A cell stack comprising a plurality of battery cells as recited in claim 6.

8. A redox flow battery system comprising the electrode as recited in claim 1.

9. A redox flow battery system comprising the battery cell as recited in claim 6.

10. A redox flow battery system comprising the cell stack as recited in claim 7.

11. The electrode according to claim 1, wherein
the carbon fiber is immersed in an electrolytic solution of vanadium sulfate with a vanadium concentration of 1.7 M (mol/L) for 30 days, and the weight loss from before to after immersion is 1% or less.

* * * * *